United States Patent [19]

Yuhara et al.

[11] Patent Number: 4,744,824

[45] Date of Patent: May 17, 1988

[54] METHOD OF PRODUCING METALLIC MATERIALS FOR THE COMPONENTS OF NUCLEAR REACTORS

[75] Inventors: Shunichi Yuhara, Higashi-Ibaraki; Yutaka Oka, Chiba; Terufumi Sasaki, Chiba; Osamu Masuko, Chiba; Kiyohiko Nohara, Chiba; Tomoo Tanaka, Chiba, all of Japan

[73] Assignees: Doryokuro Kakunenryo Kaihatsu Jigyodan, Tokyo; Kawasaki Steel Corporation, Kobe, both of Japan

[21] Appl. No.: 868,789

[22] Filed: May 29, 1986

[30] Foreign Application Priority Data

Jun. 6, 1985 [JP] Japan .................. 60-123106
Jun. 20, 1985 [JP] Japan .................. 60-135070

[51] Int. Cl.$^4$ .......................................... C22B 23/00
[52] U.S. Cl. ................................................ 75/82
[58] Field of Search .......................................... 75/82

[56] References Cited

U.S. PATENT DOCUMENTS 4,078,951 3/1978 Denzine .................. 75/82
4,175,950 11/1979 Linares .................. 75/82

Primary Examiner—Peter D. Rosenberg
Attorney, Agent, or Firm—Balogh, Osann, Kramer, Dvorak, Genova & Traub

[57] ABSTRACT

A method of producing metallic materials for the components of nuclear reactors is disclosed, which comprises adding a boron-containing material having a value of $^{11}B/(^{10}B+^{11}B)$ larger than that of natural boron to molten metal before deboronification refining. The resulting metallic materials are used even under neutron irradiation without causing $^{10}B(n, \alpha)^7Li$ nuclear reaction.

3 Claims, 2 Drawing Sheets

METHOD OF PRODUCING METALLIC MATERIALS FOR THE COMPONENTS OF NUCLEAR REACTORS

BACKGROUND OF THE INVENTION

1. Field of the Invention

This invention relates to a method of producing metallic materials for components of nuclear reactors subjected to neutron irradiation, for example, metallic materials used as reactor vessels for fast breeder reactor, light water reactor, nuclear fusion reactor and so on. More particularly, it relates to a method of producing metallic materials containing a slight amount of boron (B), such as carbon steel, low chromium.molybdenum (Cr—Mo) steel, ferritic high chromium steel, stainless steel, superalloys and the like.

2. Related Art Statement

As is well-known, ASTM A533 B Cl. 1 steel, A508 Cl. 3 steel and the like are, for example, used as a low carbon steel for reactor pressure vessel. On the other hand, low Cr—Mo steels, ferritic high chromium steels and ferritic stainless steels are considered to be applied to nuclear reactors, particularly fast breeder reactor and nuclear fusion reactor because they are cheap in the cost and excellent in the properties as compared with austenitic stainless steels. Furthermore, superalloys such as Inconel, Incolloy and the like have excellent thermal resistance and oxidation resistance, so that they are considered to be applied to nuclear reactors, particularly nuclear fusion reactor.

Moreover, the austenitic stainless steels have excellent high-temperature strength and corrosion resistance, so that they are used for various structural components in the nuclear reactor since early times. Particularly, their use for reactor vessels in fast breeder reactor and light water reactor subjected to thermal neutron irradiation will be expected.

In the austenitic stainless steel, it is known from, for example, PNC Technical Review No. 50 or Japanese Patent laid open No. 53-88,499 that the addition of B makes carbides fine and stable to restrain intergranular precipitation of carbide and strengthen grain boundaries, resulting in the improvement of strength and ductility as well as workability.

As described above, the addition of B to the austenitic stainless steel is effective from viewpoints of the strengthening of grain boundaries and the like, but has the following problems.

In general, boron is composed to two isotopes $^{10}B$ and $^{11}B$ as natural boron, a natural content of which is about 19.6% $^{10}B$ and about 80.4% $^{11}B$. Among these isotopes, $^{10}B$ is particularly large in the thermal neutron absorption, so that when the B-containing austenitic stainless steel is used in a vessel of a nuclear reactor subjected to thermal neutron irradiation, $^{10}B$ is transmuted by $^{10}B(n, \alpha)^7Li$ nuclear reaction even under thermal neutron irradiation at a relatively small dose of about $10^{17}$ n/cm$^2$ into helium (He). This He promotes the occurrence and propagation of creep cracking, resulting in the creep embrittlement.

Furthermore, austenitic stainless steels containing intentionally no boron contain B of at least about few ppm through the usual steel-making process. In this case, there is a fear of causing creep embrittlement due to $^{10}B$ transmutation under thermal neutron irradiation as mentioned above.

In the metallic materials other than the austenitic stainless steel, such as carbon steel, low Cr—Mo steel, ferritic high chromium steel, ferritic stainless steel or superalloy, B is added for improving the creep rupture strength or hardenability. Even if it is intended not to intentionally add B, the above metallic material usually contains at least about few ppm of B as an impurity through the refining process. In any case, when these metallic materials are applied to the reactor vessel used under thermal neutron irradiation, $^{10}B$ is transmuted by $^{10}B(n, \alpha)^7Li$ nuclear reaction to He gas likewise the case of the austenitic stainless steel. Such He atoms not only cause the creep embrittlement as mentioned above, but also result in the degradation of mechanical properties such as reductions of high-temperature ductility and creep rupture strength and the like.

Therefore, it is demanded to develop metallic materials for the components of nuclear reactors, which contain a boron ingredient having a $^{11}B$ content larger than that of natural boron and may avoid the formation of He due to the $^{10}B$ transmutation. In this connection, $^{11}B$-enriched compounds, which are suitable as a starting boron ingredient required for the industrial production of the above metallic materials used in the nuclear reactors, have not hitherto been produced.

As a method of producing $^{11}B$-enriched compound as compared with the natural boron, there are a method wherein boric acid is precipitated from sodium borate, calcium borate, crude boron or the like as a boron starting material, purified through recrystallization and separated by utilizing the weight difference between $^{10}B$ and $^{11}B$, a method wherein a boron halide is formed from boric acid and separated by utilizing the difference in chemical characteristics thereof, and the like. In the latter method, the $^{11}B$-enriched halide is converted into metallic boron by a direct metal reduction process, a molten salt electrolytic process or a hydrogen reduction process.

In case of adding $^{11}B$ to the metallic material, there is an adopted method wherein boric acid or metallic boron is directly added to the metallic material in the melting and refining thereof. However, boric acid is liable to surface upward in molten steel because of the poor wettability and the small specific gravity, so that it is very difficult to add boric acid at an adequate amount and hence the yield of $^{11}B$ is low. On the other hand, the addition of metallic boron has some weak points that it is liable to surface upward because of the small specific gravity and is high in the production cost because of the complicated production process, resulting in the economical demerit in using this metallic material for the components of nuclear reactors.

SUMMARY OF THE INVENTION

It is, therefore, an object of the invention to provide a method of producing metallic materials capable of effectively preventing the occurrence of creep embrittlement due to transmutation of $^{10}B$ to He when the B-containing metallic material is used for structural components of nuclear reactors subjected to thermal neutron irradiation irrespective of the intentional addition of B or the mere presence of B as an impurity.

Particularly, the invention is to provide metallic materials causing a less or no formation of He due to the (n, $\alpha$) reaction between $^{10}B$ and neutron even under neutron irradiation environment, i.e. metallic materials capable of holding the same degree of properties even under neutron irradiation such as improved creep strength, high-temperature ductility and the like in air by adding an optimum amount of $^{11}$B.

As previously mentioned, the creep embrittlement under thermal neutron irradiation results from the formation of He by the reaction of $^{10}$B, i.e. $^{10}$B(n, α)$^7$Li nuclear reaction in the isotopes of B, while $^{11}$B is stable under neutron irradiation and does not cause the nuclear reaction for He formation. According to the invention, therefore, when producing metallic materials such as carbon steel, low Cr—Mo steel, ferritic high chromium steel, ferritic stainless steel, austenitic stainless steel, superalloy and the like, a ratio of $^{10}$B content to total B content ($=^{10}$B$+^{11}$B) in molten metal [$^{10}$B/($^{10}$B$+^{11}$B)] is previously reduced by intentional addition of stable $^{11}$B, and thereafter the refining with the removal of boron compounds from B-added metallic material (hereinafter referred to as deboronification refining) is performed to provide a metallic material having a low content of $^{10}$B, which causes troubles under thermal neutron irradiation, without changing the objective total B content ($=^{10}$B$+^{11}$B).

That is, the invention provides a method of producing metallic materials for the components of nuclear reactors under neutron irradiation environmemt, which comprises adding a boron-containing material having a ratio of $^{11}$B content to ($^{10}$B$+^{11}$B) content larger than that of natural boron to molten metal for the formation of a given metallic material, and then subjecting them to a deboronification refining to reduce the $^{10}$B content in the metallic material.

In a preferred embodiment of the invention, the boron-containing material is a ferroboron containing 5 to 30 weight percent of boron, in which an amount of $^{11}$B is not less than 90 weight percent (wt %) of total boron amount, and having a melting point of not higher than 1650° C.

BRIEF DESCRIPTION OF THE DRAWINGS

The invention will be described with reference to the accompanying drawings, wherein.

DESCRIPTION OF THE PREFERRED EMBODIMENTS

Figure 1:
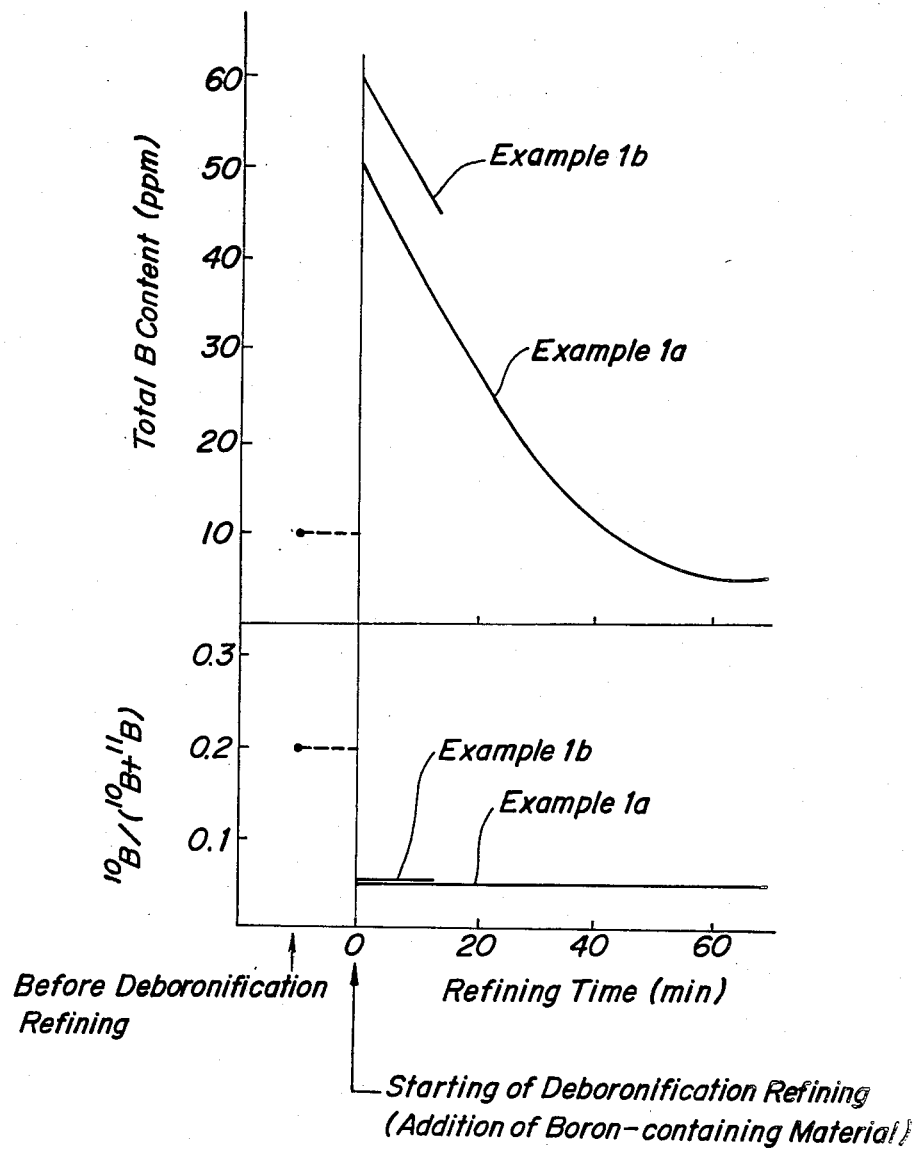
FIG. 1 is a graph showing changes of total B content and $^{10}$B/($^{10}$B$+^{11}$B) in molten iron during deboronification refining in Example 1 according to the invention.

According to the invention, a boron-containing material having a high ratio of $^{11}$B content, i.e. a value of $^{11}$B/($^{10}$B$+^{11}$B) larger than that of natural boron is intentionally added to molten metal in the production of the metallic materials. Since the natural boron is composed of $^{10}$B: 19.6% and $^{11}$B: 80.4% as previously mentioned, B-containing materials having a $^{11}$B content of more than 80.4%, such as Fe-B alloy, boron oxide (B$_2$O$_3$), boric acid (H$_3$BO$_3$) and the like are used in the invention. In the actual production process, it is desirable that the $^{11}$B content in the B-containing material such as Fe-B alloy or the like is not less than 90% from viewpoints of production cost and prevention of creep embrittlement after thermal neutron irradiation. In other words, it is desired to add the B-containing material containing more than 90% of $^{11}$B and less than 10% of $^{10}$B.

According to the invention, it is preferable to use a ferroboron containing 5-30% of boron with a $^{11}$B content of not less than 90% and having a melting point of not higher than 1650° C. When the B content in the ferroboron is less than 5%, it is necessary to add a greater amount of ferroboron for including a desired amount of $^{11}$B into molten metal, which becomes uneconomical, while when it exceeds 30%, the melting point of the resulting ferroboron becomes higher than 1650° C. and the specific gravity tends to become lower. Therefore, the boron content of the ferroboron should be not more than 30%, preferably not more than 25%. If the melting point of the ferroboron exceeds 1650° C., it is difficult to uniformly dissolve and mix the ferroboron into molten metal in a short time, while it is undesirable that the specific gravity of the ferroboron becomes lower, because the ferroboron surfaces upward in molten metal and hence the yield of $^{11}$B added to molten metal unfavorably lowers.

As described above, the melting point of the ferroboron tends to become higher than 1650° C. as the boron content is more than 30%. In this case, however, the melting point of the ferroboron may be adjusted to not higher than 1650° C. by adding a third element such as nickel or the like.

In the above ferroboron, when the amount of $^{11}$B to the total B content [$^{11}$B/($^{10}$B$+^{11}$B)] is less than 90%, the effect of controlling the amount of He produced under neutron irradiation environment by reducing the amount of $^{10}$B in molten metal is small, and also the economical merit on the production of $^{11}$B-enriched ferroboron is lost.

In the production of such ferroborons, the following processes may be adopted, that is, they are a process of melting and refining a $^{11}$B-enriched boron compound such as boric acid and iron ingredient together with substances required in the refining in an electric furnace such as a high frequency heating furnace or the like, a thermit process wherein $^{11}$B-enriched boric acid and iron ingredient are heated at an elevated temperature together with aluminum (Al) powder, and so on.

In the former process, carbon or the like is used for the reduction of the boron compound, so that the resulting ferroboron contains a few amount of carbon. In this case, however, the carbon content may be reduced by prolonging the refining time, if necessary, whereby a low carbon ferroboron (JIS G2318) having a carbon content of not more than 0.2% can be obtained. In the latter process, the resulting ferroboron usually contain 4–5% Al owing to the use of Al powder. This Al content is dependent upon the amount of Al powder used in the starting materials for the production of the ferroboron, which can be determined by considering the reduction efficiency of $^{11}$B. Moreover, the Al content of not more than 12% is accepted in the low carbon ferroboron as defined above in specification of Japanese Industrial Standard.

According to the invention, the boron-containing material as mentioned above may be added before a time performing the deboronification in the production process of the objective metallic material. In general, the metallic material such as carbon steel, low Cr—Mo steel, ferritic high chromium steel, stainless steel or superalloy is produced through the refining by subjecting molten metal to a preliminary treatment, and then subjecting to a rough decarburization in a converter or an electric furnace and further to a vacuum decarburization in VOD furnace, RH degassing vessel or AOD furnace. In a certain case, the refining of the metallic material may be performed without the preliminary treatment. Since the deboronification proceeds together with the decarburization, the boron-containing material is added to molten metal for steel or alloy at the time of the preliminary treatment or before or during the rough decarburization in the converter or the electric furnace. In certain circumstances, the boron-containing material may be added to molten metal before the vacuum decarburization.

According to the invention, the boron-containing material having a ratio of $^{11}B/(^{10}B+^{11}B)$ higher than that of natural boron is intentionally added to molten metal, so that the ratio of $^{11}B/(^{10}B+^{11}B)$ in the total boron content of molten metal becomes higher than that of natural boron. The amount of the boron-containing material added may be determined in accordance with the deboronification degree in the process of deboronification refining when the addition effect of B is not expected in the finally obtained metallic material (i.e. B only remains as an impurity). On the other hand, if it is intended to expect the addition effect of B such as the strengthening of grain boundary or the like in the final product, the amount of the boron-containing material added may be determined in accordance with the objective B residual amount and the deboronification degree in the process of deboronification refining.

In the process of deboronification refining, the remaining total boron content in molten metal is reduced, but the ratio of $^{11}B/(^{10}B+^{11}B)$ in the remaining boron content is unchangeable as apparent from the following examples. The metallic material having a total B content, which is reduced from the starting B content to a given value, and a ratio of $^{11}B/(^{10}B+^{11}B)$ of the remaining B content higher than that of natural boron can be obtained after the deboronification refining. That is, in the resulting metallic material, the ratio of $^{10}B$ among the isotopes in the remaining boron, which results in the creep embrittlement under thermal neutron irradiation, i.e. $^{10}B/(^{10}B+^{11}B)$ is smaller than that of natural boron and becomes smaller than that of the conventional metallic material having the same remaining total boron content, so that the possibility of causing creep embrittlement under thermal neutron irradiation can be reduced as compared with the case of using the conventional metallic material without damaging improved creep strength and high-temperature ductility.

In the refining of steels such as stainless steel, low carbon steel and the like, FeSi (ferrosilicon), FeMn (ferromanganese), SiMn (silicon manganese) or the like is frequently added to molten metal for the purpose of deoxidation or the like. However, such an additive usually contains B as an inevitable impurity, so that it is desirable to use the additive having a boron content as small as possible by taking the final boron content after the process of deboronification refining into consideration.

Moreover, it is a matter of course that the deboronification refining may be repeated two times or more, whereby the reduction of $^{10}B$ absolute amount can be more achieved.

The following examples are given in illustration of the invention and are not intended as limitations thereof.

EXAMPLE 1

An austenitic stainless steel having a chemical composition of 0.05 wt % C, 0.50 wt % Si, 1.00 wt % Mn, 0.020 wt % P, 0.006 wt % S, 9.0 wt % Ni, 18.3 wt % Cr, 0.0005 wt % B and the balance being Fe and inevitable impurities was produced through rough decarburization in a converter and vacuum decarburization in a VOD furnace serving as deboronification refining. In this case, the deboronification refining was carried out in a small experimental refining vessel simulating the commercial production procedure under the following four conditions (A)–(D). Moreover, molten steel before the deboronification refining contained 10 ppm B as an impurity.

(A) The deboronification refining was carried out up to B content of 5 ppm without adding the boron-containing material (Comparative Example 1);

(B) A 80% Fe-20% B alloy having a value of $^{11}B/(^{10}B+^{11}B)$ equal to natural boron (about 80%) was added by B amount of 10 ppm, then the deboronification refining was carried out up to B content of 5 ppm (Comparative Example 2);

(C) After a 80% Fe-20% B alloy having a value of $^{11}B/(^{10}B+^{11}B)$ of 98%, which is higher than that of natural boron (about 80%), was added by B amount of 40 ppm, the deboronification refining was carried out up to B content of 5 ppm (Example 1a); and (D) After the same 80% Fe-20% B alloy as in the above item (C) was added in B amount of 50 ppm, the deboronification refining was carried out up to B content of 45 ppm (Example 1b).

In all of the above deboronification refining process, the sampling was made on occasion to measure total B content and $^{10}B/(^{10}B+^{11}B)$. The measured results are shown in FIGS. 1 and 2.

Figure 2:
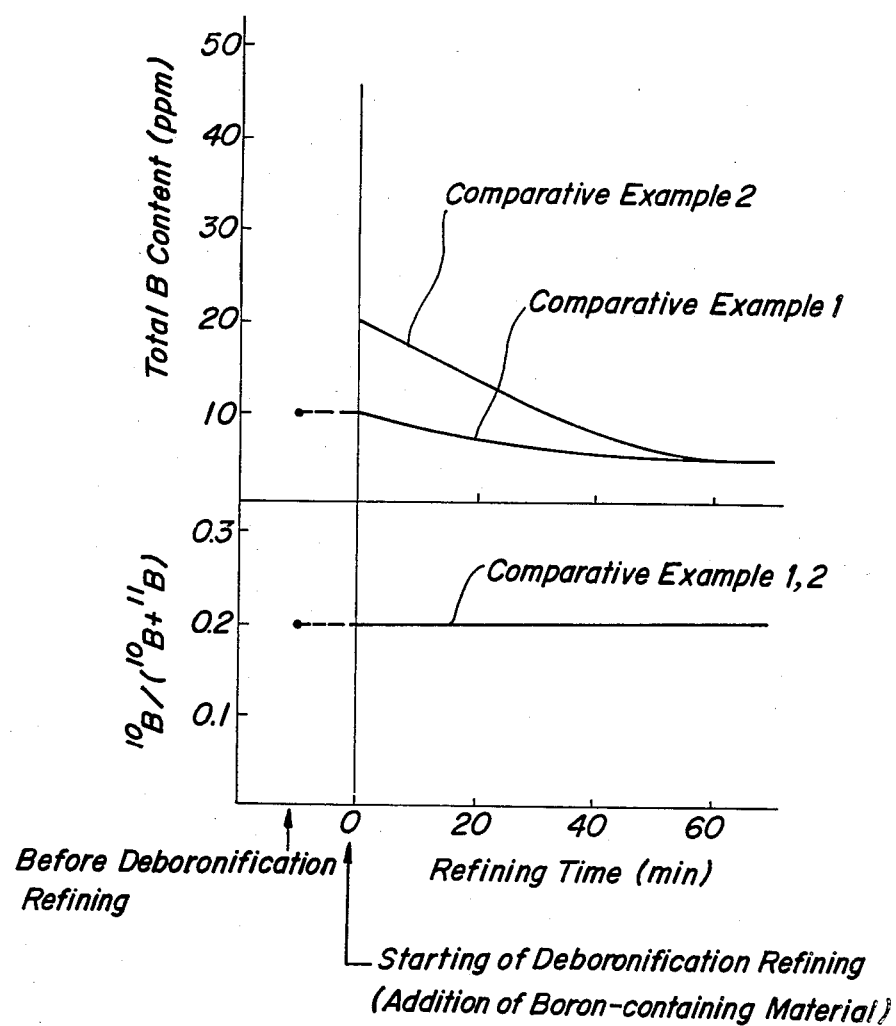
FIG. 2 is a graph showing changes of total B content and $^{10}$B/($^{10}$B$+^{11}$B) in molten iron in Comparative Examples 1 and 2 according to the conventional methods.

FIG. 2 shows Comparative Example 1 adding no boron-containing material and Comparative Example 2 adding the boron-containing material with $^{10}B$ ratio, $^{10}B/(^{10}B+^{11}B)$, equal to the natural boron. In case of Comparative Example 1, the B content was merely reduced from 10 ppm (corresponding to the impurity amount before the deboronification refining) to 5 ppm, so that the value of $^{10}B/(^{10}B+^{11}B)$ was substantially held at the ratio of natural boron, 0.2 during the refining process. In case of Comparative Example 2, the B content was reduced from 20 ppm at the starting of refining (by the addition of the boron-containing material) to 5 ppm, while $^{10}B$ ratio was substantially held at 0.2 during the refining because the boron-containing material added had the value of $^{11}B/(^{10}B+^{11}B)$ equal to the natural boron.

On the contrary, FIG. 1 shows Examples 1a and 1b according to the invention adding the boron-containing material with $^{11}B$ ratio, $^{11}B/(^{10}B+^{11}B)$, of 98% considerably higher than that of natural boron, respectively. As seen from FIGS. 1a and 1b, the $^{10}B$ ratio at the starting time of deboronification was made to 0.05 by the addition of such boron-containing material, and thereafter the $^{10}B$ ratio of 0.05 was substantially maintained over the whole period of deboronification refining, so that austenitic stainless steels having a $^{10}B$ ratio considerably lower than those of Comparative Examples 1 and 2 were obtained.

Although the deboronification refining is performed in laboratory in Example 1, it is not intended as limitation thereof, and it is a matter of course that the deboronification is applicable to the melting in the preliminary treatment, the refining in converter, electric furnace, VOD furnace, AOD furnace or RH degassing vessel and the like as previously mentioned.

In Example 1, the 80% Fe-20% B alloy is used as the boron-containing material for reducing the $^{10}B$ ratio, but the similar effect can be obtained even when using the boron-containing materials such as ferroboron and so on other than the above alloy.

EXAMPLE 2

This example shows the production of low carbon steels.

When refining each of low carbon steels A and B having an objective chemical composition as shown in the following Table 1, a boron-containing material having a $^{11}B$ ratio larger than that of natural boron was added at the last stage of the refining and then the deboronification refining was performed. In the following Table 2 are shown $^{10}B$ amount in molten steel before deboronification refining, increment of B amount in molten steel by addition of boron-containing material, $^{11}B$ ratio in boron-containing material, $^{10}B$ amount just after the addition of boron-containing material, and total B content, $^{10}B$ ratio and $^{10}B$ content after deboronification refining. Moreover, Run Nos. 5 and 7 of Table 2 show comparative examples adding no boron-containing material, respectively and Run No. 6 shows a comparative example adding a boron-containing material with $^{11}B$ ratio equal to that of natural boron according to the conventional manner.

As apparent from Table 2, according to the invention, the total B content in steel after the deboronification refining is approximately equal to those in Run Nos. 5, 6 and 7, but the $^{10}B$ ratio and absolute $^{10}B$ content are considerably reduced, so that the invention is effective for the reduction of $^{10}B$ in the low carbon steel.

EXAMPLE 3

This example shows the production of low Cr—Mo steel and ferritic high chromium steel.

When refining each of steels C, D and E having an objective chemical composition as shown in the following Table 3, a boron-containing material with $^{11}B$ ratio larger than that of natural boron was added at the last stage of the refining, and thereafter the deboronification refining was performed. In the following Table 4 are shown $^{10}B$ amount in molten steel before deboronification refining, increment of B amount in molten steel by addition of boron-containing material, $^{11}B$ ratio in boron-containing material, $^{10}B$ amount just after the addition of boron-containing material, and total B content, $^{10}B$ ratio and $^{10}B$ content after deboronification refining. Moreover, Run Nos. 7, 9 and 10 show comparative examples adding no boron-containing material, respectively, and Run No. 8 shows a comparative example adding a boron-containing material with $^{11}B$ ratio equal to that of natural boron according to the conventional manner.

TABLE 1

| Steel | C | Si | Mn | P | S | Cu | Ni | Cr | Mo | V | (wt %) B |
|---|---|---|---|---|---|---|---|---|---|---|---|
| A | 0.16 | 0.25 | 1.15 | 0.003 | 0.002 | 0.01 | 0.75 | 0.09 | 0.51 | 0.004 | 0.0005 |
| B | 0.20 | 0.27 | 1.41 | 0.004 | 0.005 | 0.11 | 0.50 | — | 0.51 | — | 0.0005 |

TABLE 2

| Run No. | Kind of steel | $^{10}B$ amount before deboronification refining (ppm) | Increment of B in molten steel (ppm)* | $^{11}B$ ratio in boron-containing material $\frac{^{11}B}{^{10}B + ^{11}B}$ | $^{10}B$ amount just after addition of boron-containing material (ppm) | B content after refining Total B content (ppm) | $\frac{^{10}B}{^{10}B + ^{11}B}$ | $^{10}B$ content (ppm) | Remarks |
|---|---|---|---|---|---|---|---|---|---|
| 1 | A | 1.2 | 40 | 0.90 | 5.2 | 5.1 | 0.11 | 0.56 | Example |
| 2 | " | 1.2 | 40 | 0.98 | 2.0 | 5.2 | 0.04 | 0.21 | |
| 3 | B | 1.0 | 20 | 0.90 | 3.0 | 5.0 | 0.12 | 0.60 | |
| 4 | " | 1.0 | 20 | 0.98 | 1.4 | 5.1 | 0.06 | 0.31 | |
| 5 | A | 2.0 | — | — | — | 5.2 | 0.2 | 1.0 | Comparative |
| 6 | " | 1.2 | 20 | 0.8 | 5.2 | 5.1 | 0.2 | 1.0 | Example |
| 7 | B | 2.0 | — | — | — | 5.2 | 0.2 | 1.0 | |

*Amount of B increased by addition of boron-containing material to molten steel

TABLE 3

| Steel | C | Si | Mn | P | S | Cr | Mo | Al | N | (wt %) B |
|---|---|---|---|---|---|---|---|---|---|---|
| C | 0.22 | 0.21 | 0.43 | 0.01 | 0.003 | 2.21 | 1.1 | 0.008 | 0.004 | 0.0005 |
| D | 0.08 | 0.11 | 0.42 | 0.01 | 0.004 | 9.12 | 1.0 | 0.005 | 0.011 | 0.0005 |
| E | 0.20 | 0.32 | 0.54 | 0.01 | 0.005 | 12.13 | 1.1 | 0.005 | 0.012 | 0.0005 |

TABLE 4

| Run No. | Kind of steel | $^{10}B$ amount before deboronification refining (ppm) | Increment of B in molten steel (ppm)* | $^{11}B$ ratio in boron-containing material $\frac{^{11}B}{^{10}B + ^{11}B}$ | $^{10}B$ amount just after addition of boron-containing material (ppm) | B content after refining Total B content (ppm) | $\frac{^{10}B}{^{10}B + ^{11}B}$ | $^{10}B$ content (ppm) | Remarks |
|---|---|---|---|---|---|---|---|---|---|
| 1 | C | 1.0 | 20 | 0.90 | 3.0 | 4.9 | 0.12 | 0.60 | Example |
| 2 | " | 1.0 | 20 | 0.98 | 1.4 | 5.2 | 0.06 | 0.31 | |
| 3 | D | 1.2 | 40 | 0.90 | 5.2 | 5.1 | 0.11 | 0.56 | |
| 4 | " | 1.2 | 40 | 0.98 | 2.0 | 4.9 | 0.04 | 0.20 | |
| 5 | E | 1.0 | 40 | 0.90 | 5.0 | 5.0 | 0.11 | 0.55 | |

TABLE 4-continued

| Run No. | Kind of steel | $^{10}$B amount before deboronification refining (ppm) | Increment of B in molten steel (ppm)* | $^{11}$B ratio in boron-containing material $\frac{^{11}B}{^{10}B + ^{11}B}$ | $^{10}$B amount just after addition of boron-containing material (ppm) | B content after refining Total B content (ppm) | $\frac{^{10}B}{^{10}B + ^{11}B}$ | $^{10}$B content (ppm) | Remarks |
|---|---|---|---|---|---|---|---|---|---|
| 6 | " | 1.0 | 40 | 0.98 | 1.8 | 4.8 | 0.04 | 0.19 | |
| 7 | C | 1.0 | — | — | — | 5.1 | 0.2 | 1.0 | Comparative |
| 8 | " | 1.2 | 20 | 0.8 | 5.2 | 5.0 | 0.2 | 1.0 | Example |
| 9 | D | 1.2 | — | — | — | 5.2 | 0.2 | 1.0 | |
| 10 | E | 1.0 | — | — | — | 4.9 | 0.2 | 1.0 | |

*Amount of B increased by addition of boron-containing material to molten steel

As apparent from Table 4, according to the invention, the total B content in steel after the deboronification refining is approximately equal to those in Run Nos. 7–10, but the $^{10}$B ratio and absolute $^{10}$B content are considerably reduced, so that the invention is effective for the reduction of $^{10}$B in low Cr—Mo steels and ferritic high chromium steels.

EXAMPLE 4

This example shows the production of superalloys.

When refining each alloy of Incolloy 800 H and Inconel 625 having an objective chemical composition as shown in the following Table 5, a boron-containing material having a $^{11}$B ratio larger than that of natural boron was added at the last stage of the refining, and thereafter the deboronification refining was performed. In the following Table 6 are shown $^{10}$B amount in molten alloy before deboronification refining, increment of B amount in molten alloy by adding of boron-containing material, $^{11}$B ratio in boron-containing material, $^{10}$B amount just after the addition of boron-containing material, and total B content, $^{10}$B ratio and $^{10}$B content after the deboronification refining. Moreover, Run Nos. 5 and 7 show comparative examples adding no boron-containing material, respectively, and Run No. 6 shows a comparative example adding a boron-containing material with a $^{11}$B ratio equal to that of natural boron according to the conventional manner.

TABLE 5

| | | | | | | | (wt %) |
|---|---|---|---|---|---|---|---|
| Alloy | C | Si | Mn | P | S | Ni | Cr |
| F | 0.06 | 0.4 | 0.5 | 0.02 | 0.001 | 32.5 | 21.2 |
| G | 0.02 | 0.2 | — | 0.005 | 0.001 | balance | 21.2 |
| Alloy | Al | Ti | B | Mo | Nb | N | Fe |
| F | 0.4 | 0.3 | 0.0005 | — | — | — | balance |
| G | 0.14 | 0.3 | 0.0005 | 8.5 | 3.6 | 0.02 | 4.1 |

(Note)
F alloy Incolloy 800H
G alloy Inconel 625

As apparent from Table 6, according to the invention, the total B content in alloy after the deboronification refining is approximately equal to those in Run Nos. 5–7, but the $^{10}$B ratio and absolute $^{10}$B content are considerably reduced, so that the invention is also effective for the reduction of $^{10}$B in the superalloy.

Although the productions of austenitic stainless steel, low Cr—Mo steel, ferritic high chromium steel and superalloy have been described in Examples 1–4, it is a matter of course that the invention is effectively applied to the production of the other metallic materials such as ferritic stainless steels, martensitic stainless steels and so on.

EXAMPLE 5

Boric acid having a value of $^{11}$B/($^{10}$B+$^{11}$B) of 98%, pure iron powder and carbon required for the refining were mixed at a mixing ratio as shown in the following Table 7 and melted in a high frequency heating furnace. As a result of a boron isotope analysis on the resulting ferroboron after the melting, the $^{11}$B ratio in total boron content was unchanged at 98%.

TABLE 7

| | Sample 1 | Sample 2 | Sample 3 |
|---|---|---|---|
| Starting materials for the production of ferroboron | | | |
| boric acid (%) | 33 | 52 | 58 |
| iron powder (%) | 64 | 41 | 34 |
| carbon (%) | 3 | 7 | 8 |
| Properties of ferroboron | | | |
| boron content (%) | 8 | 16 | 20 |
| $^{11}$B/($^{10}$B + $^{11}$B) (%) | 98 | 98 | 98 |
| carbon content (%) | 1.1 | 0.5 | <0.5 |
| melting point (°C.) | 1390 | 1540 | 1600 |
| specific gravity | 7.2 | 6.2 | 5.6 |

The ferroborons obtained had a melting point of not higher than 1650° C. and a specific gravity of not less than 5. These properties show that when such a ferroboron is added as a steel-making material to molten steel,

TABLE 6

| Run No. | Kind of alloy | $^{10}$B amount before deboronification refining (ppm) | Increment of B in molten steel (ppm)* | $^{11}$B ratio in boron-containing material $\frac{^{11}B}{^{10}B + ^{11}B}$ | $^{10}$B amount just after addition of boron-containing material (ppm) | B content after refining Total B content (ppm) | $\frac{^{10}B}{^{10}B + ^{11}B}$ | $^{10}$B content (ppm) | Remarks |
|---|---|---|---|---|---|---|---|---|---|
| 1 | F | 1.2 | 40 | 0.90 | 5.2 | 5.1 | 0.11 | 0.56 | Example |
| 2 | " | 1.0 | 20 | 0.90 | 3.0 | 5.2 | 0.12 | 0.62 | |
| 3 | G | 1.0 | 40 | 0.98 | 1.8 | 5.0 | 0.04 | 0.20 | |
| 4 | " | 1.2 | 20 | 0.98 | 1.6 | 5.1 | 0.06 | 0.31 | |
| 5 | F | 1.0 | — | — | — | 5.0 | 0.2 | 1.0 | Comparative |
| 6 | " | 1.2 | 20 | 0.8 | 5.2 | 4.9 | 0.2 | 1.0 | Example |
| 7 | " | 1.2 | — | — | — | 5.2 | 0.2 | 1.0 | |

*Amount of B increased by addition of boron-containing material to molten steel it is melted in a short time and uniformly mixed with molten steel.

After the degassing at the last refining stage of steel SUS 304, the ferroboron of Sample No. 3 was added in an amount of 15 g per 100 kg of molten steel. Immediately, the ferroboron was melted in molten steel. After the melting of the ferroboron, molten steel was tapped out, from which an analytical sample was taken. As a result of boron analysis on the sample, the total boron content was 28 ppm, and the $^{11}$B ratio in total boron content was 95%.

EXAMPLE 6

Anhydrous boric acid having a value of $^{11}$B/($^{10}$B+$^{11}$B) of 98%, iron powder and aluminum powder were mixed at a mixing ratio of 15:57:28, which was heated at 1000° C. through a thermit process to obtain a ferroboron. The resulting ferroboron had a value of $^{11}$B/($^{10}$B+$^{11}$B) of 98%, which was equal to that of the anhydrous boric acid as a starting material, and contained 4.2% Al and 20.3% B.

The ferroboron was added by an amount of 10 g per 100 kg of molten steel after the degassing at the last refining stage of steel SUS 304. Immediately after the melting of the ferroboron, molten steel was tapped out, from which an analytical sample was taken. As a result of boron analysis on the sample, the total boron content was 25 ppm, and the $^{11}$B ratio in total boron content was 94%.

As seen from the above Examples, according to the invention, there can be obtained metallic materials having a $^{10}$B ratio, which produces nuclear reaction causing creep embrittlement when being subjected to thermal neutron irradiation, considerably lower than that of the conventional metallic material. That is, in the B-containing metallic material according to the invention, there is a little fear of causing creep embrittlement even under thermal neutron irradiation, so that B can intentionally be added to strengthen grain boundaries and the like as a metallic material used for components in nuclear reactors subjected to thermal neutron irradiation. Further, the invention makes possible to prevent the risk of creep embrittlement due to thermal neutron irradiation in the metallic material merely containing B as an impurity.

Particularly, $^{11}$B may be added without increasing the amount of $^{10}$B in steel by using $^{11}$B-enriched ferroboron as a steel-making material.

For fear of harmfulness of He produced by the reaction between neutron and $^{10}$B, the intentional addition of B has hitherto been not performed to metallic materials used under neutron irradiation, and it was only rather attempted to reduce the boron content of the metallic material to an economically acceptable range. On the contrary, according to the invention, the use of $^{11}$B-enriched ferroboron makes possible to add an economically proper amount of $^{11}$B with avoiding the degradation of properties due to the He formation.

Thus, in the metallic materials obtained by adding $^{11}$B-enriched ferroboron according to the invention, the favorable interaction between $^{11}$B and the other element prevents (n·α) nuclear reaction of $^{10}$B, so that the addition effect of $^{11}$B is completely held even under neutron irradiation. Therefore, the addition of $^{11}$B to the metallic material used under neutron irradiation can widely be performed, resulting in the developmental promotion of materials having an improved resistance to neutron irradiation. Moreover, the use of such materials can considerably improve the safety and service life of components in nuclear reactors.

What is claimed is:

1. A method of producing metallic materials for the components of nuclear reactors, which components are under neutron irradiation environment, which comprises adding a boron-containing material having a ratio of $^{11}$B content to ($^{10}$B+$^{11}$B) content larger than the ratio of $^{11}$B content to ($^{10}$B+$^{11}$B) content of about 0.8 in naturally produced boron to molten metal for the production of a given metallic material, and then subjecting to a refining process for decreasing the total boron content in molten metal.

2. The method according to claim 1, wherein said boron-containing material contains boron consisting of more than 90% $^{11}$B and less than 10% $^{10}$B.

3. The method according to claim 1, wherein said boron-containing material is a ferroboron containing 5 to 30 weight percent of boron, in which an amount of $^{11}$B is not less than 90 weight percent of total boron amount, and having a melting point of not higher than 1650° C.

* * * * *